United States Patent [19]
Bland et al.

[11] Patent Number: 5,546,568
[45] Date of Patent: Aug. 13, 1996

[54] CPU CLOCK CONTROL UNIT

[75] Inventors: Patrick M. Bland, Delray Beach; Robert T. Jackson, Boyhton Beach, both of Fla.; Jayesh Joshi, Santa Clara; James Kardach, San Jose, both of Calif.

[73] Assignees: Intel Corporation, Santa Clara, Calif.; International Business Machines Corporation, Armonk, N.Y.

[21] Appl. No.: 176,944

[22] Filed: Dec. 29, 1993

[51] Int. Cl.⁶ .................................................. G06F 1/08
[52] U.S. Cl. .................................................. 395/550
[58] Field of Search .................................. 395/550, 750

[56] References Cited

U.S. PATENT DOCUMENTS

| | | | |
|---|---|---|---|
| 4,785,416 | 11/1988 | Stringer | 395/550 |
| 4,851,987 | 7/1989 | Day | 395/550 |
| 5,175,853 | 12/1992 | Kardach et al. | 395/650 |
| 5,369,771 | 11/1994 | Gettel | 395/750 |
| 5,390,350 | 2/1995 | Chung et al. | 395/750 |
| 5,392,437 | 2/1995 | Matter et al. | 395/550 |
| 5,428,765 | 6/1995 | Moore | 395/550 |
| 5,430,881 | 7/1995 | Ikeda | 395/550 |

*Primary Examiner*—Kevin A. Kriess
*Assistant Examiner*—John Q. Chavis
*Attorney, Agent, or Firm*—Blakely, Sokoloff, Taylor & Zafman

[57] ABSTRACT

The present invention relates to an apparatus and method for controlling a CPU clock in response to certain events with a system in order to conserve power usage. These events can be programmably enabled or disabled. The apparatus comprises a circuit for detecting enabled Stop Clock events requiring the CPU clock to temporarily cease operation. In combination therewith, the present invention includes a circuit for detecting enabled Stop Break events which are used to re-start the CPU clock. The present invention further comprises a Speedup circuitry to increase the CPU clock speed for enabled speedup events which are dependent on CPU clock speed.

34 Claims, 7 Drawing Sheets

| 10h BIT 7 | 10g BIT 6 | 10f BIT 5 | 10e BIT 4 | 10d BIT 3 | 10c BIT 2 | 10b BIT 1 | 10a BIT 0 |

15

| 10p BIT 7 | 10o BIT 6 | 10n BIT 5 | 10m BIT 4 | 10l BIT 3 | 10k BIT 2 | 10j BIT 1 | 10i BIT 0 |

15

| 32 BIT 7 | 31 BIT 6 | 30 BIT 5 | 29 BIT 4 | 28 BIT 3 | BIT 2 | 27 BIT 1 | 26 BIT 0 |

15

CPU CLOCK CONTROL UNIT

BACKGROUND OF THE INVENTION

1. Field of the Invention

The present invention relates to a power management architecture scheme for a central processing unit ("CPU") implemented within a computer system. More particularly, the present invention relates to an apparatus and method for controlling a CPU clock in response to certain events within the computer system.

2. Background of the Field

It is becoming a necessity for many companies to use portable and laptop computers in their daily business activities. As a result, in order to acquire market share in an expansive and competitive portable and laptop computer industry, many computer manufacturers are attempting to decrease consumer operating costs in order to make their respective computers more affordable. As a result, for economic reasons and reliability concerns, there exists an increasing need for efficient power management architecture schemes in order to conserve power supplied by limited power sources, such as, for example, batteries.

In response to the obvious need for effective power management, Intel had developed an Intel Architecture Microprocessor ("MP") 1 comprising a central processing unit ("CPU") 2, a Power Management Macro ("PMM") 3 and a bus controller 4, each of which being coupled together by an internal system bus 5, as illustrated in FIG. 1. The MP 1 was coupled to an external system bus 6, commonly an 8-bit bus, so as to enable data communications between a plurality of peripheral devices 7a–7n and both the CPU 2 and PMM 3 via the bus controller 4. The PMM 3 for the MP I provides a circuit which controls the CPU clock 8 through asserting or deasserting a $\overline{STP\_CLK}$ interrupt signal line 9. Coupled to the PMM 3 and the CPU 2, the $\overline{STP\_CLK}$ signal line 9 is an active-low interrupt signal which allows the CPU clock 8 to be controlled by the PMM 3 in response to certain events; namely, a Stop Clock event or a Stop Break event. The Stop Clock event causes the CPU clock 8 to temporarily cease operations. The Stop Break event, on the other hand, causes the CPU clock 8 to re-start.

The PMM 3 is typically a programmable power manager comprising a plurality of storage elements, such as registers, used to maintain a list of peripherals 7a–7n which are powered-on or powered-off, a list of physical addresses of such peripherals, and circuits to monitor the internal system bus 5 for certain events. As a result, the PMM 3 is programmed in accordance with the plurality of peripherals 7a–7n coupled to the external system bus 6.

However, a few distinct disadvantages are associated with the conventional power management scheme. For example, when a computer system is idle or running an application that is not computationally intensive, power was wasted because the CPU clock 8 was unnecessarily running at its highest frequency during such times. The present invention, however, proposes slow clock emulation through "clock throttling" (i.e., alternatively running and idling the CPU clock) and selective speed up of the CPU clock in response to certain system events in the Intel Architecture Microprocessor environment. Such emulation has involved thorough redesigning of the PMM. By combining slow clock emulation with conventional stop clock and re-start clock requests, the present invention offers greater power savings than realized by conventional power management because the CPU clock is stopped as often as possible, even while the system is active (but at a low level of activity). It also offers a better response time compared to the conventional schemes, because being employed for only a programmable duration, the CPU uses its maximum frequency to service critical events in the system.

Accordingly, it would be advantageous to maximize power savings with minimal impact on performance as well as to provide a power management scheme which not only allows the CPU clock to become idle, but also provides a power management scheme which controls power by selectively altering the clock speed of the CPU clock and allows the CUP to emulate any desired frequency up to its maximum frequency.

SUMMARY OF THE INVENTION

The present invention describes a power management architecture scheme in a computer system and more particularly, a plurality of clock control registers, which in combination with various conventional logic, enable an internal CPU clock to be exposed to a number of conditions. Such conditions include temporarily disabling the CPU clock, slow clock emulation by dynamically stopping and re-starting the clock and abrupt clock restart in order to respond to certain special events. The duration of these conditions is based on the corresponding duration of either a control signal or a timer associated with the condition.

BRIEF DESCRIPTION OF THE DRAWINGS

The objects, features and advantages of the present invention will be apparent from the following detailed description of the present invention in which.

DETAILED DESCRIPTION OF THE INVENTION

An apparatus and method are described for controlling power usage of an internal CPU clock through a plurality of clock control registers operating in combination with various conventional logic devices to temporarily disable, dynamically slow-down and restart the CPU clock. In the following detailed description, numerous specific details are set forth, such as specific events which effect CPU clock operations. It is apparent, however, to one skilled in the art that the present invention may be practiced without operating in response to such specific events. It should be kept in mind that the present invention need not be limited for use in connection with controlling a CPU clock, but may find wide application for many other clocks. In other instances, well-known structures and operations have not been described in detail in order to avoid unnecessarily obscuring the present invention.

Figure 2:
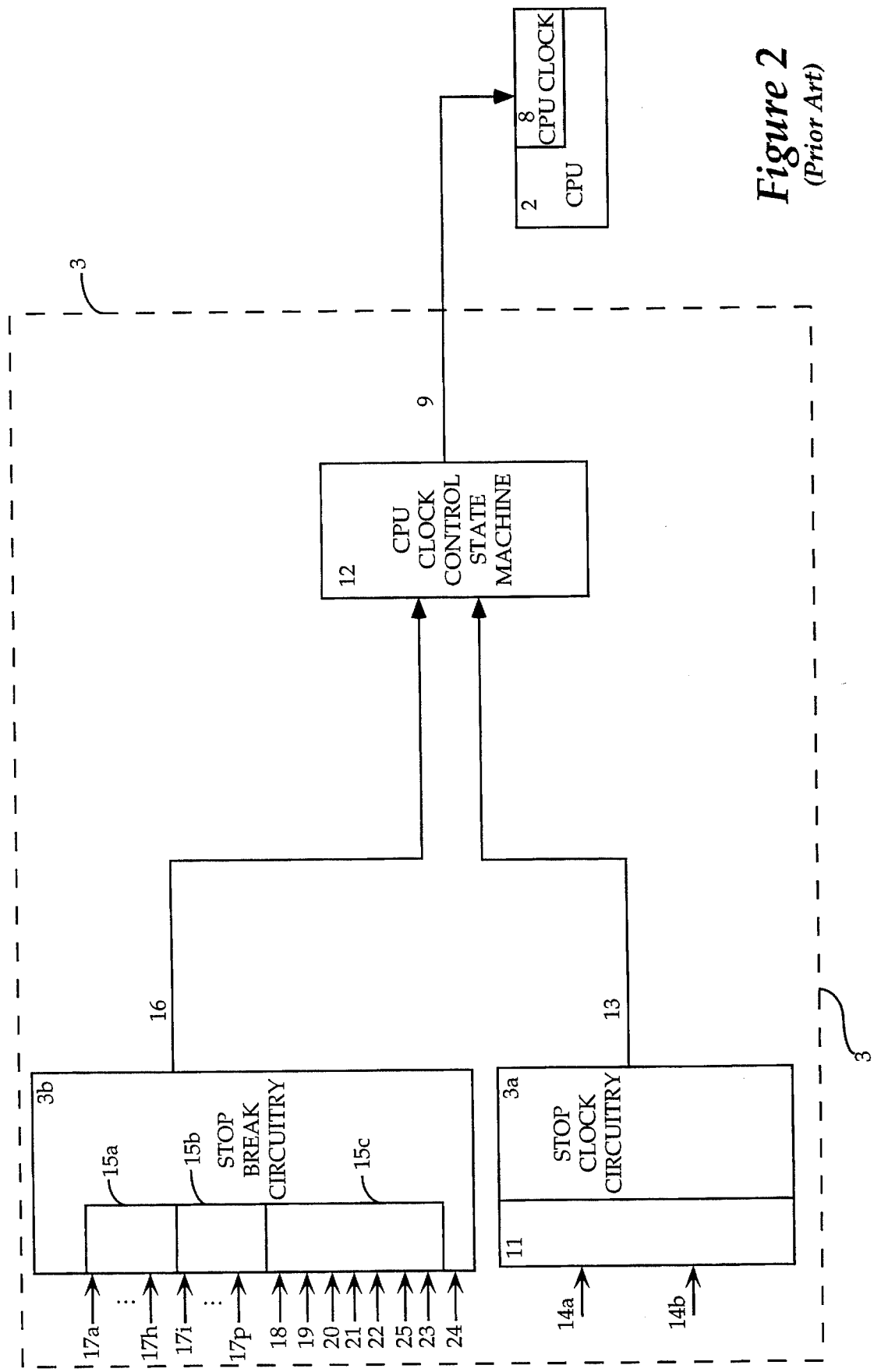
FIG. 2 is a diagram of the embodiment of a conventional power management macro.

Referring to FIG. 2, it illustrates the conventional PMM 3 comprises two circuits 3a and 3b for servicing Stop Clock events and Stop Break events respectively. The Stop Clock circuit 3a consists of at least one maskable register 11 to store a logic "1" or logic "0" (if active low) upon detection of the Stop Clock event. The maskable register 11, which is driven by conventional logic elements (not shown), is coupled to a CPU Clock Control State Machine 12 through a STP_CLK_EVNT signal line 13. If the Stop Clock circuit 3a detects any Stop Clock events, it activates the STP_CLK_EVNT signal line 13 causing the CPU Clock Control State Machine 12 to assert the $\overline{\text{STP\_CLK}}$ signal line 9. The assertion of the $\overline{\text{STP\_CLK}}$ signal line 9 causes the CPU clock 8 to temporarily discontinue operation until the $\overline{\text{STP\_CLK}}$ signal line 9 is deasserted. The MP 1 supports two Stop Clock events, a first of which is a "Halt" instruction 14a. The second Stop Clock event is when the CPU 2 detects a stop clock register read instruction 14b awaiting execution by the CPU 2.

With respect to the Stop Break circuit 3b of the conventional PMM 3, it includes a plurality of configuration registers 15a–15c which are used to detect a Stop Break event. Upon detection of the Stop Break event, the PMM 3 activates a STP_BRK_EVNT signal line 16, thereby causing the CPU Clock Control State Machine 12 to deassert the $\overline{\text{STP\_CLK}}$ signal line 9 in order to re-start the CPU clock 8. As shown in FIG. 2, the MP 1 is susceptible to many stop break events including, (i) sixteen active maskable interrupts input signal lines IRQ0–IRQ15 17a–17p, (ii) an active maskable interrupt ("INTR")25, (iii) an active non-maskable interrupt ("NMI") 18, (iv) an active parity error ("$\overline{\text{PERR}}$") 19, (iv) an active system bus channel check ("CHCHK") 20, (vi) a hardware suspend request event ("HW_SUSREQ") 21 which is activated if there is an auto power-off suspend request, a low battery power suspend request or a suspend/resume button suspend request, (vii) any System Management Interrupt ("SMI") event 22 such as peripheral Idle timers and (viii) an active ring indicator 23. Moreover, there exists at least one CPU reset signal 24 ("CPU RESET") which is a non-maskable Stop Break event and thereby automatically causes the CPU Clock Control State Machine 12 to deassert the $\overline{\text{STP\_CLK}}$ signal line 9.

Figures 3, 4:
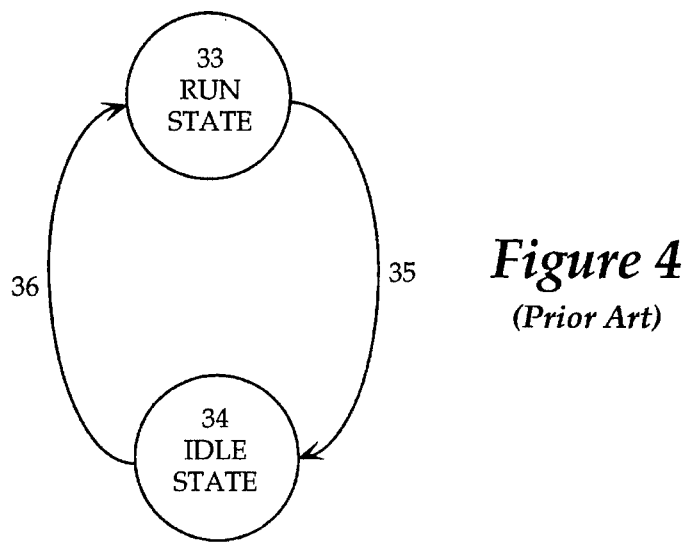
FIG. 3 illustrates conventional stop break registers incorporated within the conventional power management macro.
FIG. 4 is a state diagram of the operating of a conventional power management scheme.

Referring now to FIG. 3, the plurality of configuration registers of the Stop Break circuit 3b includes three eight-bit registers, wherein a first register 15a includes stop break select enable bits 10a–10h, which enable (unmask) a first set of eight interrupt request signals 17a–17h, referred to as IRQ0–IRQ7, while a second register 15b includes stop break select enable bits 10i–10p, which enable (unmask) a second set of eight interrupt request signals 17i–17p, referred to as IRQ8–IRQ15. Each of the above-identified interrupt request bits IRQ0–IRQ15 17a–17p are generally designated to certain peripherals such as a keyboard, floppy disk drive, etc. For example, in the IBM PC/AT architecture, the keyboard uses IRQ1 and the floppy disk drive uses IRQ6. If any of the interrupt request signals 17a–17p are asserted while their respective maskable select enable bits 10a–10p are set, the PMM 3 would activate the STP_BRK_EVNT signal 16 so that the CPU Clock Control State Machine 12 would, in turn, deassert the $\overline{\text{STP\_CLK}}$ signal line 9 to restart the CPU clock 8.

The third register 15c is a compilation of various interrupt request bits as defined below:

Bit 0 is designated as a Stop Break Select Enable bit (a STP_BRK_SEL_EN" bit) 26. The STP_BRK_SEL_EN bit 26 is a global enable bit for the stop break select registers which enables the $\overline{\text{STP\_CLK}}$ signal 9 to be asserted if any enabled stop clock event occurs, such as, for example, a "Halt" instruction. Setting the STP_BRK_SEL_EN bit 26 not only enables any stop break event that has its respective maskable select enable bit set, but also enables all stop clock events. The PMM 3, however, always regards CPU RESET 24 as an enabled stop break event regardless of the state of this bit.

Bit I is a Ring Select bit ("RING_SEL" bit) 27 which is used by the PMM 3 to indicate a modem ring. The RING_SEL bit 27 is determined by the state of a pair of ring indicator bits.

Bit 2 is reserved for another unrelated application.

Bit 3 is an Interrupt Select bit (the "INTR_SEL" bit) 28 which enables any active interrupt signaled by a programmable interrupt controller ("PIC"), as a stop break event. When the INTR_SEL bit 28 or the STP_BRK_SEL_EN bit 26 is reset, the INTR signal 25 is not used as a stop break event.

Bit 4 is a Non-Maskable Interrupt Select bit (the "NMI_SEL" bit) 29 which enables a Non-Maskable Interrupt ("NMI") 18 as a stop break event. The NMI signal 18 indicates that an I/O controller is requesting interrupt service from the CPU 2. When the STP_BRK_SEL_EN bit 26 or the NMI_SEL bit 28 is reset, the NMI signal 18 is not used as a stop break event.

Bit 5 is a Parity Select bit (the "PERR_SEL" bit) 30 which enables a parity error signal ("$\overline{\text{PERR}}$") 19 as a stop break event by asserting the STP_BRK_EVNT signal line 16. When the $\overline{\text{PERR}}$ signal 19 is asserted low indicating a parity error from a memory controller and the PERR_SEL bit 29 is set, the PMM 3 will generate a stop break event. When the STP_BRK_SEL_EN bit 26 or the $\overline{\text{PERR\_SEL}}$ bit 30 is reset, the $\overline{\text{PERR}}$ signal 19 is not used as a stop break event.

Bit 6 is a Channel Check Select bit (the "$\overline{\text{CHCHK\_SEL}}$" bit) 31 which enables an active I/O channel check as a stop break event. When the $\overline{\text{CHCHK}}$ signal line 20 is asserted low and the CHCHK_SEL bit 31 is set, the PMM 3 will generate a stop break event. When the STP_BRK_SEL_EN bit 26 or the $\overline{\text{CHCHK\_SEL}}$ signal line 20 is reset, the $\overline{\text{CHCHK}}$ bit 31 is not used as a stop break event.

Lastly, bit 7 is a Hardware Suspend Request Event Select bit (the "SUS_EVNT_SEL" bit) 32 which enables a hardware suspend event signaled by HW_SUSREQ 21 as a stop break event. A suspend event includes, but is not limited to, expiration of a power-off timer, depression of (setting) a suspend resume button, or a low battery condition. If the HW_SUSREQ signal 21 is asserted and the SUS_EVNT_SEL bit 32 is set, the PMM 3 would generate a stop break event. When the STP_BRK_SEL_EN bit 26 or the SUS_EVNT_SEL bit 32 is reset, the HW_SUSREQ signal 21 is not used as a stop break event.

In order to minimize the number of registers within the PMM 3, two additional stop break events are included in bits 6 and 7 of a Keyboard Clock Control Register (not shown).

Bit 6 is a System Management Interrupt Select bit (a "ANYSMI_SEL" bit) which enables a SMI request 22 to operate as a stop break event. Such SMI requests 22 include I/O traps, standby timer expiration, etc.

Bit 7 is an External System Management Interrupt Select bit (a "EXT_SMI_SEL" bit) which when set, enables a system management interrupt asserted by any external logic device to generate a Stop Break Event.

As shown, conventional power management schemes for controlling CPU clock 8 were generally accomplished by running and stopping the CPU clock 8. FIG. 4 illustrates a state diagram of the conventional power management scheme, wherein there exists two states; namely, a CPU Clock Run state 33 and a CPU Clock Idle state 34. Moreover, each of the CPU Clock Run and CPU Clock Idle states 33 and 34 have one state transition 35 and 36. A first transition 35 denotes when any of the Stop Clock events previously mentioned are detected. A second transition 36, however, denotes when any of the Stop Break events are detected. The CPU 2, by default, remains in the CPU Clock Run state 33 unless any of the Stop Clock events previously described are detected. Upon detection of the Stop Clock event, the CPU 2 enters into the CPU Clock Idle state 34 until the CPU 2 is re-started by any Stop Break event. Upon detection of the stop break event, the CPU 2 returns to the CPU clock run state 33.

Figure 1:
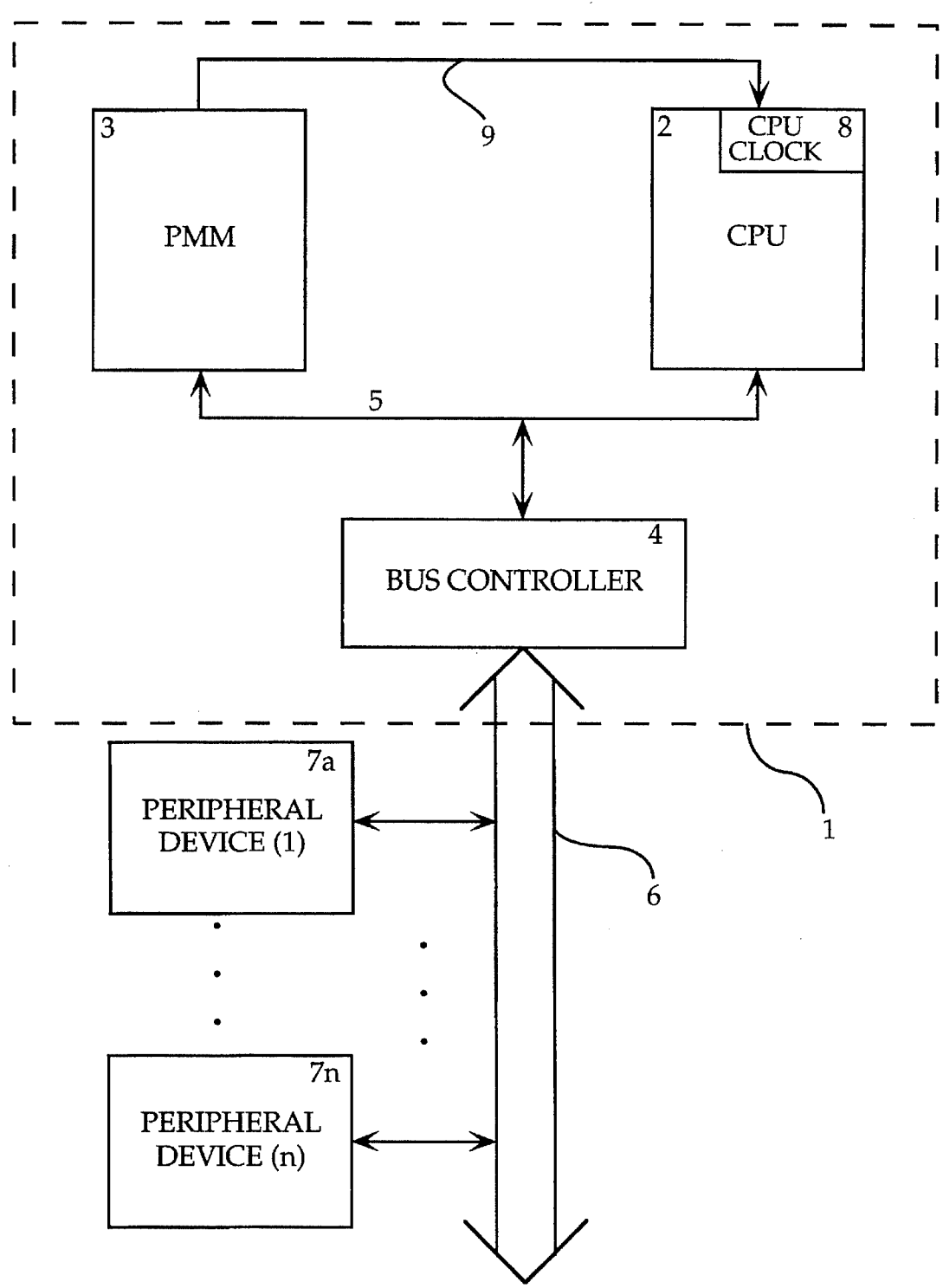
FIG. 1 illustrates a block diagram of a computer system incorporating a conventional power management architecture scheme implemented into the Intel Architecture Microprocessor ("IAM").
Figure 5:
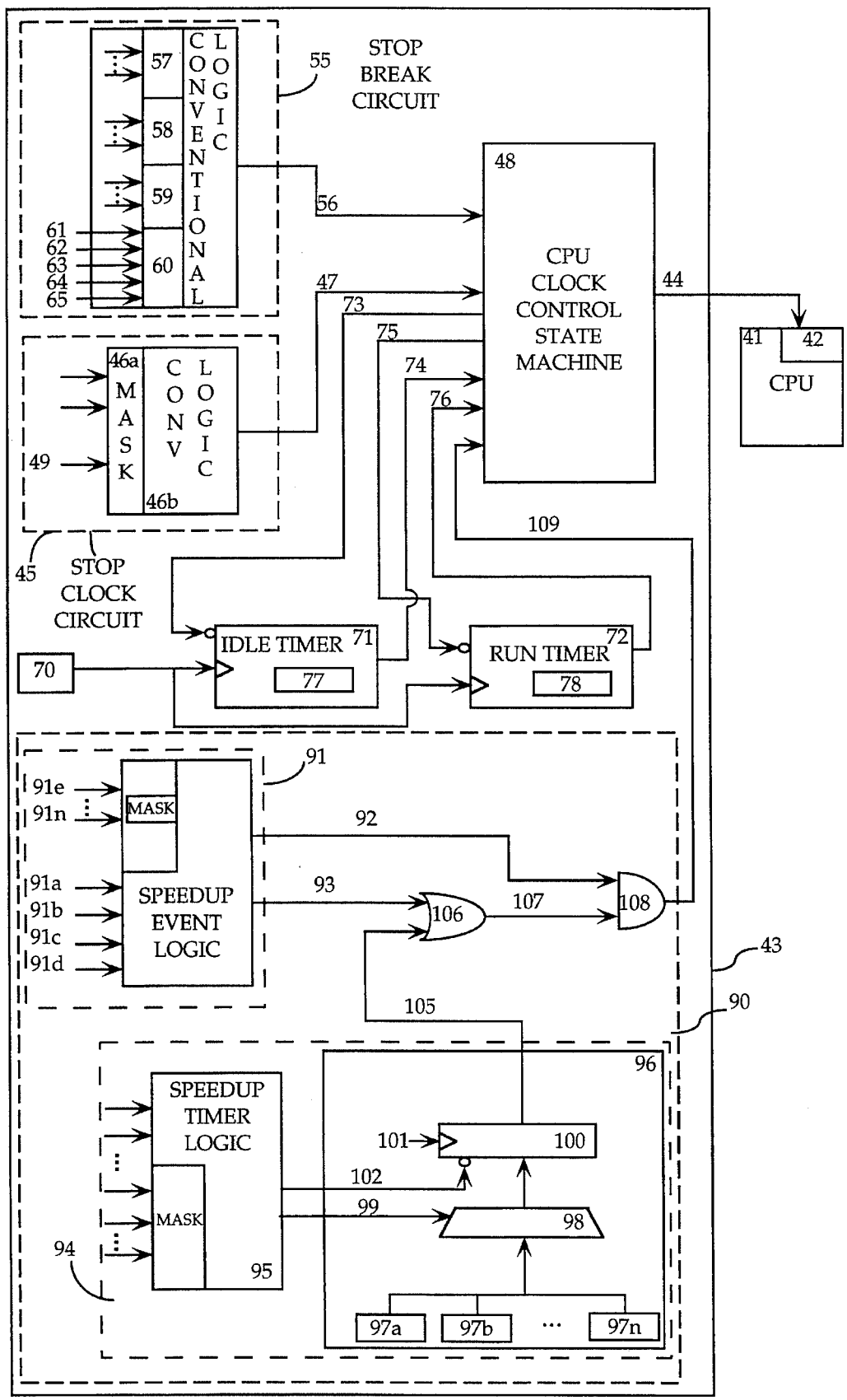
FIG. 5 is block diagram of a first embodiment of the present invention.

As shown in FIG. 5, the CPU clock 42 within a computer system is controlled by the present invention in a manner similar to the MP 1 illustrated in FIG. 1, wherein a PMM 43 is coupled to a CPU 41 through an interrupt control signal line $\overline{STP\_CLK}$ 44. Hence, the CPU clock 42 within the CPU 41 is capable of being stopped and re-started by the $\overline{STP\_CLK}$ signal 44. More specifically, since the control signal line $\overline{STP\_CLK}$ 44 is "active low", the falling edge of the $\overline{STP\_CLK}$ signal stops the CPU clock 42 while the rising edge re-starts the CPU clock 42.

Contrary to the conventional prior art power management scheme, the present invention incorporates additional circuitry within the PMM 43, such as programmable registers which provides the PMM 43 with an ability to slow down or speed up the CPU clock 42. Thus, instead of operating in two states (i.e., the CPU Clock Run 33 and CPU Clock Idle 34 states as illustrated in FIG. 4), the present invention enables a computer system to operate in three states in order to realize maximum power savings. These three states include (i) a "Clock Speedup" state 120, (ii) a "Clock Stop Idle" state 121 and (iii) a "Frequency Emulation" state 122. This Frequency Emulation state has two sub-states called "Clock Run Emulation" 123 and "Clock Idle Emulation" 124. These states are shown and discussed in reference to a state diagram illustrated in FIG. 11.

As a result, the PMM 43 supports the conventional Stop Clock events of the Intel Architecture Microprocessor as well as an additional Stop Clock event; more particularly, a Stop Clock event from an external power management controller ("EPMC"), discussed later in more detail.

Referring back to FIG. 5, being similar to the Intel Architecture Microprocessor 1, the PMM 43 includes circuitry which stops the CPU clock 42 upon detection of a Stop Clock event. The Stop Clock circuit 45 includes at least one maskable register 46a, preferably programmable as potentially all of the registers in the present invention, having bits corresponding to certain Stop Clock events. The Stop Clock circuit 45 further includes conventional logic 46b to operate in association with the at least one maskable register 46a. If the Stop Clock circuit 45 detects any Stop Clock events, it activates a STP_CLK_EVNT signal line 47 to prompt a CPU Clock Control State Machine 48 to assert the $\overline{STP\_CLK}$ signal 44.

The present invention allows power management software control of the Stop Clock circuit 45. Power management software will detect that the CPU 41 is idle by either transparent or cooperative means to application and O/S software. Transparent power management is implemented by special hardware that generates a System Management interrupt (SMI) whenever the hardware detects the system to be idle. Cooperative power management is implemented by a hierarchy of cooperating layers of software that provide power management support. The operating system and/or application program can better determine when the system is idle, and generate a software SMI to notify the power management hardware. Once the power management SMI handler detects that the system is idle, it then generates a stop clock event such as execution of the HLT instruction.

Figure 6:
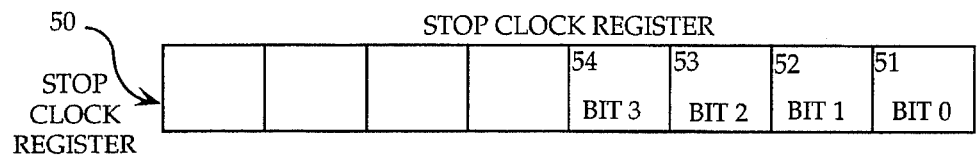
FIG. 6 is block diagram of one embodiment of a Stop Clock register.

The CPU clock 42 can be stopped by a number of events that will cause the PMM 43 to assert the $\overline{STP\_CLK}$ signal line 44 to the CPU 41. As shown in FIG. 6, a Stop Clock event register 50 is an eight-bit register used to store information concerning whether certain stop clock events are enabled, but may be designed as a register having any number of bits depending on the number of Stop Clock events to be separately enabled. In the present embodiment, since there exists only four selected Stop Clock events, and therefore, only bits 0-3 of the Stop Clock event register are used. However, if more Stop Clock events are desired, more bits and/or more registers may be used.

A first bit ("bit 0") of the Stop Clock event register 50 is a Stop Clock Register Enable bit ("STP_CLK_REG_EN" bit) 51 which, when set, enables I/O reads to the STP_CLK port to generate the Stop Clock event. A second bit ("bit 1") is set so as to cause a Stop Clock event to occur when the PMM 43 detects a "Halt" instruction 52. For backward compatibility with the Intel™ Microprocessor Architecture, the '03h default value of the Stop clock event register 50 enables bits 0 and 1.

Bit 2 is a Frequency Emulation Run Timer Enable bit ("FREQ_EMUL_RUN_TMR_EN" bit) 53 which enables a Frequency Emulation Run Timer 72. When the Run Timer 72 expires, the CPU clock 42 is stopped. Thereafter, it can be restarted only by a Speedup event or the expiration of a Frequency Emulation Idle Timer 71. A Stop Break event cannot restart the CPU clock 42, unless it is also selected as a Speedup Event in order to enhance system control. However, it is contemplated that the power management scheme could be designed so that a Speedup event restarts the CPU clock 42.

Figure 10:
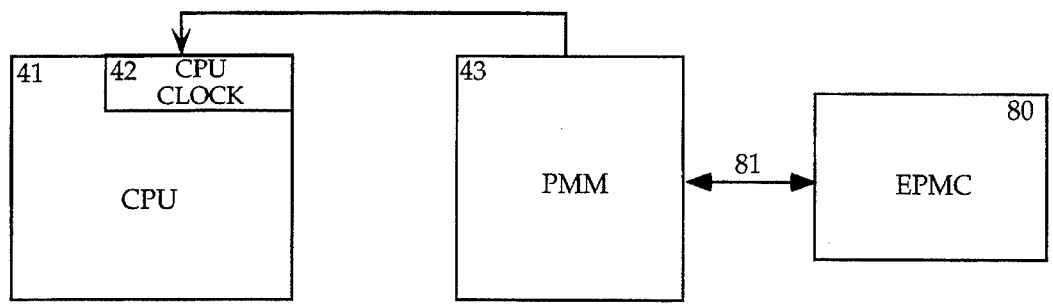
FIG. 10 is a block diagram of a third embodiment of the present invention incorporating an external power management controller.

Bit 3 is an External Power Management Controller Stop Event Enable bit ("EPMC_STP_EVNT_EN") 54 which when set, enables the EPMC 80, as shown in FIG. 10, to generate a stop clock event. As shown in FIG. 10, the EPMC 80 may be coupled to the PMM 43 through a dedicated 8-bit bus 81 in order to provide additional power management function.

As briefly referred to above, the PMM 43 in FIG. 5 also includes a circuit for restarting the CPU clock 42 through detection of Stop Break events; namely, a Stop Break circuit 55. The Stop Break circuit 55 includes a plurality of Stop Break registers driven by conventional logic. In the present embodiment, there exists four 8-bit registers 57–60, but it is contemplated that such registers could be of any number having any bit width according to the number of Stop Break events desired.

Although this embodiment of the present invention employs the additional Stop Break events discussed below, it is contemplated that there could be a greater variety of possible Stop Break events as well as Stop Clock and Speedup events than discussed. In response to the Stop Breaks, the Stop Break circuit 55 activates a STP_BRK EVNT signal line 56 which, in turn, deasserts the $\overline{\text{STP\_CLK}}$ signal line 44.

Figure 7:
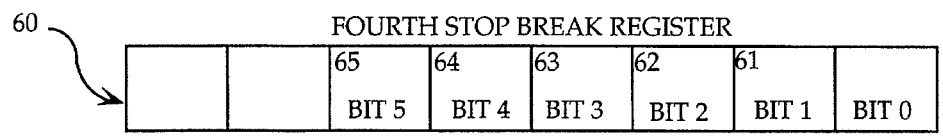
FIG. 7 is block diagram of one embodiment of a fourth Stop Break register.

Stop break events re-start the CPU clock 42 if it has been stopped by a stop clock event. The first three stop break event registers 57–59 of the PMM 43 supports the conventional Stop Break events employed in the Intel Architecture Microprocessor superset, while at least one additional register 60 as shown in FIG. 7 is used to support additional stop break events, such as, for example, a Frequency Emulation Idle Timer Enable 61, a stop break request for an EPMC 62, a Personal Computer Integrated Circuit Card ("PCIC") 63, and a global speedup enable 64 which would supersede the speedup events selected in the SU_EVENT_SEL register and many automatic speedup events, such as NMI, INTR, CPU RESET and the like.

With respect to the circuit within the PMM 43 for emulating a lower CPU clock frequency (i.e., a slower clock speed), the circuit comprises at least two timers; namely, the Frequency Emulation Idle Timer 71 and the Frequency Emulation Run Timer 72. These timers 71 and 72 are clocked by a real time clock 70 running at thirty-two kilohertz (32 KHz). This frequency was chosen as an optimal frequency because the real time clock 70 is commonly available for usage within a computer system and its frequency is fast enough to accomplish real work (i.e., allow the CPU 41 to execute instructions in large bursts). However, it is obvious that a person skilled in the art could utilize a different clock having a higher or lower frequency than disclosed above.

The Frequency Emulation circuit is enabled by activating a Frequency Emulation Idle Timer Enable bit ("FREQ_EMUL_IDL_TIMER_EN" bit) 61 and the FREQ_EMUL_RUN_TIMER_EN bit 53, which are located in the fourth Stop Break register 60 and the Stop clock event register 50 respectively. Thereafter, the CPU Clock Control State Machine 48 takes control of the frequency emulation process.

The PMM 43 is capable of emulating the lower clock frequency by periodically running and idling the CPU clock 42, which is accomplished through the Idle and Run Timers 71 and 72 in combination with a plurality of input and output control signal lines, such as signal lines 73–76. The CPU Clock Control State Machine 48 is coupled to the Idle and Run Timers 71 and 72. A first input control signal is a IDLE_TMR_EN signal line 73 which couples the CPU Clock Control State Machine 48 to the Idle Timer 71. If the CPU Clock Control State Machine 48 has activated the IDLE_TMR_EN signal line 73, the Idle Timer 71 will automatically load and start to count down when the CPU Clock 42 is stopped due to the expiration of the Run Timer 72. The Idle Timer 71 will count down for a first predetermined time period at the end of which the Idle Timer 71 will assert a first output control signal IDLE_TMR_T_OUT 74 which in turn, causes the STP_CLK signal line 44 to be deasserted, restarting the CPU Clock 42.

Similar in operation to the IDLE_TMR_EN signal line 73, a second input control signal line, referred to as a RUN_TMR_EN signal 75, couples the CPU Clock Control State Machine 48 to the Run Timer 72. Upon receipt of an active RUN_TMR_EN signal 75, the Run Timer 72 will automatically load and start to count down provided that the CPU Clock 42 is running (STP_CLK is deasserted). The Run Timer 72 will count down for a second predetermined period at the end of which the Run Timer 72 will assert a second output control signal RUN_TMR_T_OUT 76 which in turn, causes the $\overline{\text{STP\_CLK}}$ signal line 44 to be asserted and the CPU Clock 42 stopped.

As a result, the Idle and Run Timers 71 and 72 operate in a ping-pong fashion keeping the CPU clock 42 running while the Run Timer 72 is counting, and keeping the CPU clock 42 idle while the Idle Timer 71 is counting. The default values in the Idle Timer 71 and the Run Timer 72 are the same (0 FFh), so the default clock speed is half the CPU clock's speed. However, since the apparent speed of the CPU 41 is determined by the ratio of the Idle Timer 71 to the Run Timer 72 (e.g., a 1:1 ratio indicates that the CPU 41 is running at half speed), any other CPU speed can be emulated by programming different values in the two timers 71 and 72. The following table shows a few examples of the many CPU clock speeds that can be emulated:

| FREQ_EMUL_RUN_TMR Value | FREQ_EMUL_IDL_TMR Value | Ratio | CPU Speed |
|---|---|---|---|
| 1 | 1 | 1:1 | 50.0% |
| 1 | 2 | 1:2 | 33.3% |
| 1 | 3 | 1:3 | 25.0% |
| 4 | 12 | 1:3 | 25.0% |
| 4 | 28 | 1:7 | 12.5% |
| 28 | 4 | 7:1 | 87.5% |
| 15 | 38 | 15:38 | 28.3% |
| 1 | 99 | 1:99 | 1.0% |

Referring still to FIG. 5, the Frequency Emulation Idle and Run Timers 71 and 72 include registers 77 and 78 which enable programming of their respective timing intervals. These registers allows the CPU clock 42 to be run for a time period defined by a FREQ_EMUL_RUN_TMR register 77, and then stopped for a time period defined by the FREQ_EMUL_IDL_TMR register 78. The Idle and Run Timers 71 and 72 automatically load and start to count down when enabled and the CPU clock 42 is idle and running respectively (i.e., the $\overline{\text{STP\_CLK}}$ signal line 44 is asserted and deasserted, respectively). These registers 77 and 78 define the count of the Idle and Run Timers 71 and 72 in increments of any time period increment, such as 32 μs, which presents the duration of Idle and Run time intervals.

The slow clock emulation described above saves power by slowing down the CPU 41, but it also reduces performance by increasing the processing time. Speedup circuitry 90 attempts to minimize this performance reduction by monitoring critical events occurring in the computer system that are dependent on the CPU's processing speed, and then temporarily disabling the slow clock emulation when one of these events occurs. The speedup duration for various events can be based upon the activation time of a particular speedup signal or programmed independently within timers, which could provide a longer speedup duration when servicing an event that requires more computations. Such speedup duration is discontinued once the event has been serviced (i.e., deactivate the speedup signal) or the speedup timer expires. It is contemplated that Speedup events and Stop Break events can be utilized interchangeably in order to simplify control logic and control software design.

As briefly discussed, the present invention comprises the speedup circuitry 90 including speedup event logic 91 which monitors the computer system for critical events that require maximum processing speed until the event is serviced. A few examples of such speedup events include, but are not limited to a CPU Reset request 91a, an interrupt request by the PIC 91b, any SMI request 91c and a debugging request 91d ("DEBUG").

The CPU Reset signal 91a is used for resetting (i.e., re-initializing) the CPU 41. Since the CPU 41 must execute various initialization instructions after reset, maximum CPU speed is necessary. The INTR control signal 91b indicates that there is an interrupt request from the PIC that needs servicing and thus, maximum CPU speed is required. The ANY SMI REQ signal 91c is designed to signal the CPU 41 to increase its operating speed if any SMI request exists. This allows a system management interrupt service routine to service the interrupt. The DEBUG signal line 91d indicates that a debugging system (e.g. an in-circuit emulator (ice)) is in operation so maximum CPU processing speed is required.

Although only certain speedup events are briefly discussed above, the present invention can be implemented with any desired speedup event. In fact, the speedup event logic 91 further includes a plurality of maskable "Idea Ports" 91e–91n to allow real equipment manufacturers to implement other speedup events pertaining only to the manufacturer's particular computer system.

The speedup event logic 91 includes a plurality of registers and conventional logic devices (not shown) which generate a first and second speedup event output signals 92 and 93. The first speedup event signal line 92 is a global speed event enable ("SU_EN") signal line which, when inactive, can disable speedup events. The SU_EN signal line 92 can be used to disable speedup events when the computer system is operating at a low power level so as to conserve power for more important features. The second speedup event ("SU_EVNT") signal line 93 indicates whether an automatic speedup event occurs and is active for the duration thereof. The SU_EVNT signal line 93 is inputted into a logic gate 106, such as an OR gate, in combination with an output signal 105 from a Speedup Timer Event circuit 94 which is discussed below in greater detail.

Besides speeding up the CPU clock 42 based on signal activation, many speedup conditions are desired to be in operation for a predetermined time period. For example, suppose the CPU clock is idle and a person depresses a key from the computer system's keyboard, the system would not operate properly if it only increased its speed for the duration of the computer key depression. Rather, the CPU 41 may require greater service time, to find out which key was depressed, and to take action in response to that keystroke.

As a result, the present invention includes the Speedup Timer Event circuit 94 which increases the operating speed of the CPU clock 42 for a predetermined time period. The predetermined time period is determined by which speedup event has been detected by the PMM 43 because each speedup events requires a specific time for servicing. These speedup events include but are not limited to, a plurality of peripheral interrupt requests ("IRQ0–IRQn") keyboard speedups ("KYBD"), EPMC speedups ("EPMC_SU"), NMI and DEBUG.

The Speedup Timer Event circuit 94 comprises a speedup timer logic device 95 and a counter circuit 96. The speedup timer logic device 95 includes a plurality of registers in combination with conventional logic which activate a plurality of select signal lines SU_SEL 99 providing a binary representation of which speedup event was detected and an activation signal line ("TMR_EN") 102 to "turn on" the speed up timer 100 within the counter circuit 96. The activation signal line 102 is optional, but is preferred, especially when power management is desired.

The counter circuit 96 includes a plurality of speedup timer local registers 97a–97n used to store particular bit values which determine the desired speedup duration, and the generally an eight-bit value. As shown in FIG. 5, the plurality of speedup time load registers 97a–97n are coupled to a multiplexer 98 having the SU_SEL select signal lines 99. The SU_SEL select signal lines 99 are activated in accordance with the desired speedup event in order to pass a corresponding bit value into a speedup timer 100 clocked at a predetermined clock cycle 101. Upon receipt of the TMR_EN signal 102 from the Speedup Timer logic 95, the speedup timer 100 activates an output signal line (the "SU_TIMER" signal line) 105 for a time period having a duration equivalent to the inverse of the clocking frequency 101 inputted into the Speedup Timer 100 multiplied by the corresponding bit value. For example, if the local register has a value equal to 8 and the clocking frequency is equal to 1 KHz (a 1 ms time period), then the duration of the speedup would be 8 ms.

Thereafter, the SU_TIMER signal line 105 is inputted into the logic gate 106. If either the SU_EVNT or SU_TIMER signal lines 93 and 105 are activated, the logic gate 106 activates a speedup output signal line 107 which is coupled to another logic gate 108 (e.g., an AND gate). If both the SU_EN signal line 92 and the speedup output signal line 107 are active, then the Speedup Event output line 109 is asserted. The Speedup Event output line 109 is coupled to the CPU Clock Control State machine 48 so as to cause it to de-assert the $\overline{\text{STP CLK}}$ signal line 44 so that the CPU clock 42 runs at its maximum frequency until the Speedup Event output line 109 is de-asserted.

Figure 8:
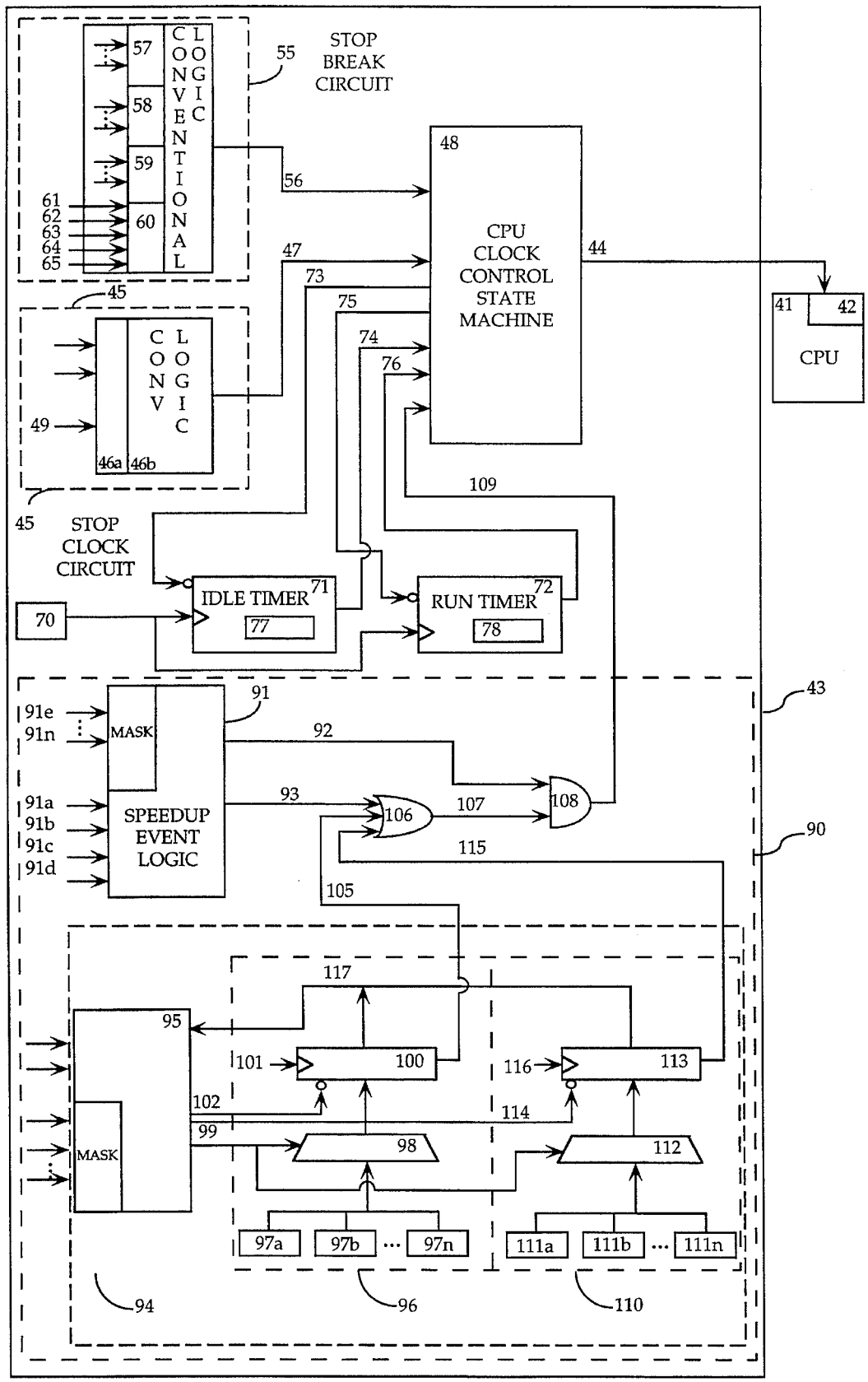
FIG. 8 is a block diagram of a second embodiment of the present invention.

Another embodiment is shown in FIG. 8 incorporating a pair of counter circuits 96 and 110, wherein the programmable clocking frequency 101 inputted into the first speedup timer 100 differs substantially from the clocking frequency 116 inputted into a second speedup timers 113. In FIG. 8, a second counter circuit 110 includes a plurality of second speedup timer load registers 111a–111n coupled to a second multiplexer 112. The second multiplexer 112 is controlled by the select signal lines SU_SEL 99. As previously stated, when the SU_SEL lines 99 are activated, they will select a certain speedup event so as to pass a certain bit value stored in the first and second plurality of speedup timer load registers 97a–97n and 111a–111n into either the first or second speedup timers 100 and 113, respectively. Similar to the above discussion, the second speedup timer 113 outputs an active SU_TIMER2 signal line 115 if the second speedup timer 113 is activated by a TMR_EN2 signal 114 for a duration measured by the bit value multiplied by the inverse of a second clocking frequency of the second speedup timer 113. For example, if speedup event is a CPU RESET having a load register value of 8 and the speedup timer 113 is clocked at 62.5 KHz (period=16 microseconds), the speedup timer 113 will generate an active SU_TIMER2 signal line 115 for 128 μs (8×16 μs) thereby causing the $\overline{\text{STP CLK}}$ signal line 44 to be deasserted to allow the CPU clock 42 to run at its maximum frequency for a 128 μs time duration.

With respect to the Clock Speedup state, this state is a default state when no frequency emulation is desired. In other words, the system exists in this state when the $\overline{\text{STP\_CLK}}$ signal 44 remains inactive. In this state, the CPU clock 42 runs at its highest frequency in order to service interrupts and perform other necessary functions. However, the Clock Speedup state enters into (i) the Frequency Emulation state, provided it is enabled if either a speedup event ends or the speedup timer expires and (ii) the Stop Clock state if there exists a stop clock event. The duration of the clock speedup state can be programmed depending on the nature of the speedup event.

If multiple speedup events occur at the same time, or if the speedup duration of one event has not expired before another event occurs, the speedup logic guarantees that the $\overline{STP\_CLK}$ signal line 44 is held inactive for the maximum speedup time by feeding back the durations via a plurality of feedback signal line 117 into the speedup timer logic device 95 which compares the two durations and activates the longer of the two. In continuing the above example, an IRQ1 is asserted with a speedup time of 10 ms, and 5 ms later, a CPU Reset request is asserted with a speedup time of 50 ms. In such a case, the total duration of speedup will be 55 ms (namely, 5 ms before CPU Reset was asserted and the speedup time of 50 ms to service the CPU Reset speedup event).

Speedup events have priority over slow clock emulation. Therefore, all Stop Clock events from the Run Timer 72 are ignored while the speedup event output line 109 is asserted. Other Stop Clock Events are not ignored.

Figure 9:
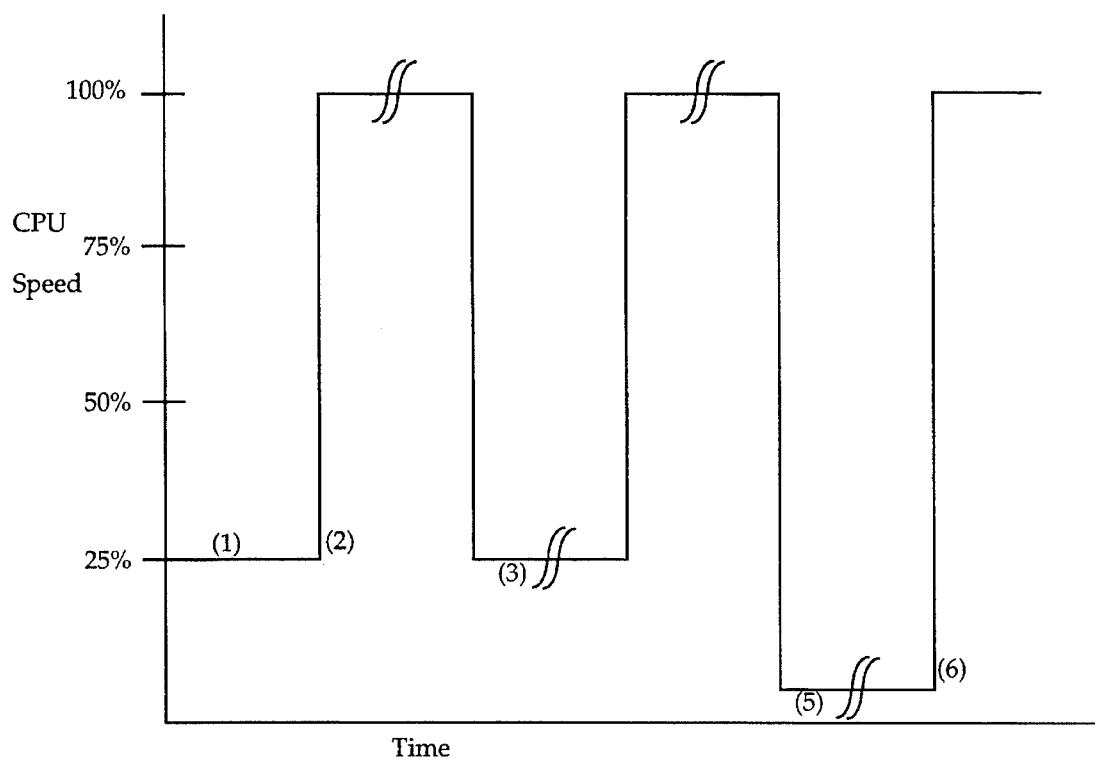
FIG. 9 is a timing diagram illustrating the operation of the present invention wherein slow clock emulation and speedup requests are made.

As shown in FIG. 9, a specific example of the slow clock emulation and speedup has been asserted for the sole purpose of illustrating the differences in operation between conventional power management systems and the present invention. This specific example lends itself to explaining the operational novelties of the present invention, but is in no way a limitation on the scope of the present invention.

Initially, the CPU 41 is running at twenty-five (25%) percent speed since the time duration of the Run Timer 72 is one-third the time duration of the Idle Timer 72 (e.g., a ratio of 1:3). At step 2, the PMM 43 detects an interrupt which causes the PMM 43 to signal the CPU 41 to increase the CPU clock speed to 100% in order to enable its interrupt software to service the interrupt. Upon servicing the interrupt, the CPU clock 42 returns to its previous slow clock emulation frequency of 25% CPU speed (step 3). At step 4, the PMM detects a global stand-by request SMI, which is a temporary "power-off" mode where the software detects no real CPU activity. As a result, the CPU 41 operates at full speed to perform certain operations, which allows the CPU 41 to enter into a low-power "stand-by" mode (step 5). However, in step 6, upon detection of a speedup event requiring maximum CPU speed, the PMM 43 generates the active Speedup Event output line 109 which causes the CPU clock control state machine 48 to deassert the $\overline{STP\,CLK}$ signal line 44 until the speedup event is serviced. Then, the CPU clock 92 returns to clock frequency emulation operation.

Another embodiment of the present invention is to implement the EPMC within the computer system. As shown in FIG. 10, the EPMC 80 may be implemented with a register that is used to generate either Stop Clock, Stop Break or Speedup events depending on which bits therein are set. The duration of the Speedup event would be based on the programmed value within a corresponding load register 97a–97n. The corresponding load registers are reset to zero by a system reset or other means such as a hardware reset. The load registers are read only to the system and read/write to the EPMC. This register can be accessed by the CPU 41 through the EPMC interface's indexed port address.

Figure 11:
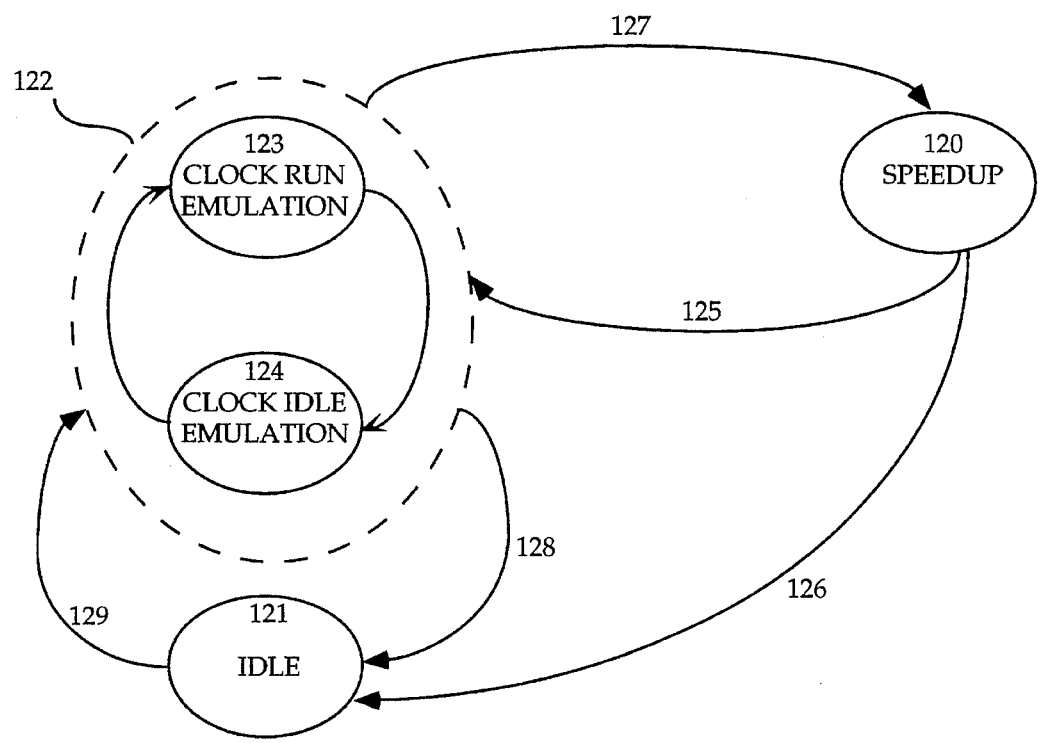
FIG. 11 is a state diagram of the operations of the present invention.

The following is a detailed description of the operations of the CPU Clock Control pursuant to the state diagram in FIG. 11. As shown and briefly discussed above, the present invention is capable of existing in three states: namely, the clock Speedup state 120, the clock stop Idle state 121 and Frequency Emulation state 122. Both the Speedup and Frequency Emulation states 120 and 122 have two state transitions each represented by the arrows 125–128 respectively. However, the clock stop Idle State 121 has only one state transition 129 since speedup events are ignored during the clock stop Idle state 121 in order to provide a distinction between Speedup events and stop break events. However, it is contemplated that there could be a transition from the clock stop Idle state 121 to clock Speedup state 120 for immediate activation of the CPU clock.

First, during initialization of a computer system incorporating a CPU, it is preferred that the CPU clock operate at its maximum frequency so as to exist in the clock Speedup state 120. Upon detection of a Stop Clock event 126 or a termination of the Speedup event 125, the system transitions into the clock stop Idle state 121 or Frequency Emulation states 123 and 124, respectively.

If the system enters into the Frequency Emulation state 122, the CPU clock operates at an emulated slow-clock frequency less than its maximum frequency, by controlling the $\overline{STP\,CLK}$ signal line 44 briefly described above. The emulated slow-clock frequency is determined by toggling between the Clock Run Emulation state 123 and the Clock Idle Emulation state 124 caused by periodically activating and deactivating the $\overline{STP\,CLK}$ signal line 44. Such toggling will cause the CPU clock 42 to appear to be running at a lesser frequency. More precisely, the ratio between the two time periods, namely, the ratio between the FREQ_EMUL_RUN_TMR register 78 and the FREQ_EMUL_IDL_TMR register 77 determines the CPU clock frequency. As a result, if the ratio is 1:1, then the CPU clock is operating at 50% speed. The system remains in the Frequency Emulation state 122 until a stop clock event or a speedup event is detected. At that time, if the stop clock event is detected 128, the CPU clock 42 stops and enters into the clock stop idle state 121 until a stop break event 142 is detected thereby returning to the Frequency Emulation state 122. If, on the other hand, a speedup event 127 is detected, the CPU clock 42 operates at the predetermined maximum_frequency and enters into the clock speedup state 120 until a stop clock event is detected or the speedup event 125 terminates. If the speedup event terminates 125, the CPU clock 42 returns to operate within the Frequency Emulation state 122. If, on the other hand, a stop clock event 126 is detected, the CPU clock 42 stops and enters into the clock stop idle state 121.

The present invention described herein may be designed using many different components and many different methods. While the present invention has been described in terms of various embodiments, other embodiments may come to mind to those skilled in the art without departing from the spirit and scope of the present invention. The invention should, therefore, be measured in terms of the claims which follow.

What we claim is:

1. An apparatus for controlling an internal clock of an electrical device, normally operating at a predetermined frequency, through a clock control output signal line coupled to the internal clock, the apparatus comprising:

clock control means for controlling a clocking frequency of the internal clock through activating and alternatively deactivating the clock control output signal line;

stop means for stopping the internal clock, said stop means being coupled to said clock control means;

restart means for restarting the internal clock, said restart means being coupled to said clock control means; and emulation means for signaling the clock control means to reduce the clocking frequency of the internal clock to be equal to a modified clocking frequency which is less than the predetermined frequency; and speedup means for increasing the clocking frequency of the internal clock upon detecting one speedup event of a plurality of speedup events in order to operate at the predetermined frequency until either said one speedup event is completed or a set time period has expired.

2. The apparatus according to claim 1, wherein said stop means includes a stop clock circuit that activates a first stop clock control signal line coupled to said clock control means upon detecting a stop clock event and thereby causes said clock control means to activate the clock control output signal line to stop the internal clock until the clock control output signal line is deactivated.

3. The apparatus according to claim 2, wherein the stop clock event can be programmably enabled and disabled.

4. The apparatus according to claim 3, wherein the stop clock circuit includes at least one storage element to indicate whether or not the stop clock event is enabled allowing said stop clock circuit to output said active stop clock input signal to said clock control means.

5. The apparatus according to claim 2, wherein the restart means includes a stop break circuit that activates at least a first stop break control signal line coupled to said clock control means upon detecting a stop break event and thereby causes said clock control means to deactivate the clock control output signal line to restart the internal clock until the clock control output signal line is activated.

6. The apparatus according to claim 5, wherein the stop break event is programmably enabled and disabled.

7. The apparatus according to claim 6, wherein the stop break circuit includes a plurality of storage elements, one of the plurality of storage elements provide information for said stop break circuit to determine whether to activate the first stop break control signal line upon detecting the stop break event.

8. The apparatus according to claim 1, wherein said emulation means includes at least one run timer and at least one idle timer being clocked by a real time clock, said run timer signals the internal clock to run at the predetermined frequency for a first time period while the idle timer signals the internal clock to stop for a second time period thereby the internal clock is operating at said modified clocking frequency.

9. The apparatus according to claim 8, wherein said modified clocking frequency is equal to a ratio between (i) the first time period and (ii) a sum total of the first and second time periods, multiplied by the predetermined frequency.

10. The apparatus according to claim 8, wherein the run timer, being clocked by said real time clock having a first frequency, includes a first storage element that contains a first number, said run timer generating a run timer output signal being active for a duration equal to said first number contained in the first storage element divided by the first frequency.

11. The apparatus according to claim 10, wherein the idle timer, being clocked by said real time clock having said first frequency, includes a second storage element that contains a second number, said idle timer generating an idle timer output signal being active for a duration equal to said second number contained in the second storage element divided by the first frequency.

12. The apparatus according to claim 11, wherein the at least one idle timer is programmable to adjust said modified clocking frequency.

13. The apparatus according to claim 10, wherein the at least one run timer is programmable to adjust said modified clocking frequency.

14. The apparatus according to claim 1, wherein said speedup means includes a speedup event output line coupled to said clock control means;

logic means for asserting said speedup output line to signal said clock control means to increase said clocking frequency of the internal clock to the predetermined frequency; and a speedup circuit coupled to a plurality of speedup event input lines to detect each of said plurality of speedup events including said one speedup event and at least one speedup event output line to at least signal said logic means that said one speedup event has been detected, said speedup circuit includes at least one storage element to indicate whether said one speedup event is enabled or disabled, said speedup circuit activates said at least one signal speedup event output line to signal said logic means to assert said speedup event output line if said one speedup event is enabled and one of said plurality of speedup event input signal lines corresponding to said one speedup event is activated.

15. The apparatus according to claim 14, wherein each of the plurality of speedup events is programmably enabled and disabled.

16. The apparatus according to claim 15, wherein the at least one speedup output signal line includes a global speedup enable signal line, wherein activation of the global speedup enable signal line disables the speedup circuit.

17. The apparatus according to claim 15, wherein said speedup circuit further includes a speedup timer event circuit to enable the internal clock to operate at the predetermined frequency for said set time period upon detecting said one speedup event, said speedup timer event circuit is coupled to said logic means.

18. The apparatus according to claim 17, wherein the speedup timer event circuit includes a speedup timer logic device coupled to at least one counter circuit through at least one select signal line and at least one timer activation line.

19. The apparatus according to claim 18, wherein each of the at least one counter circuit includes:

a plurality of local storage elements, each storage element contains a bit value corresponding to a desired time delay, a multiplexer coupled to said plurality of local storage elements though a plurality of input counter signal lines, said multiplexer outputting a selected bit value into a speedup timer, said selected bit value being chosen through said select line, and the speedup timer having a preselected clocking frequency, the speedup timer activates an active speedup timer signal line if said timer activation line is asserted, said active speedup timer signal line is coupled to said logic means.

20. The apparatus according to claim 19, wherein the set time period is determined by the bit value for the detected speedup event divided by the first clocking frequency.

21. The apparatus according to claim 19, wherein at least one counter circuit includes two counter circuits having at least one feedback signal line coupled to said active speedup timer signal line of each counter circuit, said at least one feedback signal line being inputted into the speedup timer logic device, said at least one feedback signal line controls activation of a first and second speedup timer signals.

22. An apparatus for controlling an internal clock normally operating at a predetermined frequency by altering a status of a clock control output signal line coupled to the internal clock, the apparatus comprising:

a clock control state machine that controls a clocking frequency of the internal clock through activation and alternatively deactivation of the clock control output signal line;

a stop clock circuit coupled to said clock control state machine, said stop clock circuit outputs an active stop clock input signal into said clock control state machine upon detecting a stop clock event, the active stop clock input signal causes said clock control state machine to activate the clock control output signal line;

a stop break circuit coupled to said clock control state machine, said stop break circuit outputs an active stop break event signal into said clock control state machine upon detecting a stop break event, the active stop break event signal causes said clock control state machine to deactivate the clock control output signal line; and a frequency emulation circuit coupled to said clock control state machine, said frequency emulation circuit includes at least one run timer and at least one idle timer, wherein said run timer is programmed to enable the internal clock to run for a first time period, and the idle timer is programmed to enable the internal clock to stop for a second time period.

23. The apparatus according to claim 22, wherein the stop clock event is programmably enabled and disabled.

24. The apparatus according to claim 23, wherein the stop break event is programmably enabled and disabled.

25. The apparatus according to claim 24, wherein the speedup event is programmably enabled and disabled.

26. The apparatus according to claim 25 further comprising a speedup circuit coupled to said clock control state machine, said speedup circuit operates in combination with a masking element to generate a speedup signal to instruct the internal clock to operate at the predetermined frequency upon detecting a speedup event that is enabled by said masking element; and a speedup timer event circuit coupled to said clock control state machine, said speedup timer event circuit includes a speedup timer logic device coupled to at least one counter circuit through at least a first control signal.

27. The apparatus according to claim 26, wherein the speedup timer logic device includes at least one storage element used to enable said speedup timer event circuit to generate at least the first control signal upon detecting activation of the one of the plurality of speedup event input lines.

28. The apparatus according to claim 27, wherein the at least one counter circuit includes:

a plurality of local storage elements, each storage element contains a bit value;

at least one multiplexer coupled to said plurality of local storage elements though a plurality of input counter signal lines, said multiplexer outputs a selected bit value into a speedup timer, said selected bit value being chosen by said first control signal; and the speedup timer having a first clocking frequency, the speedup timer generates an active speedup timer signal upon activation by the second control signal.

29. A computer system having a feature for controlling an internal clock operating at a predetermined frequency by altering a status of a clock control output signal line coupled to said internal clock, the computer system comprising:

means for processing instructions, said processing means including the internal clock;

means for storing said instructions and data;

means for controlling an internal clock operating at a predetermined frequency by altering a status of a clock control output signal line, said clock control output signal line being coupled to said internal clock, said controlling means including clock control means for controlling a clocking frequency of the internal clock through activating and alternatively deactivating the clock control output signal line, stop means for stopping the internal clock, said stop means being coupled to said clock control means, restart means for restarting the internal clock, said restart means being coupled to said clock control means, and emulation means for signaling the clock control means to reduce the clocking frequency of the internal clock to be equal to a modified clocking frequency which is less than the predetermined frequency, and speedup means for signaling said clock control means to increase the clocking frequency of the internal clock in order to operate at the predetermined frequency until either said at least one speedup event is completed or a set time period has expired; and bus means for providing communication between said processing means, said storing means and said controlling means.

30. A computer system comprising:

a bus;

a central processing unit coupled to said bus, said central processing unit including an internal clock normally operating at a predetermined frequency;

a memory unit coupled to said bus; and a power management unit coupled to said bus, said power management unit including a clock control output signal line coupled to said internal clock, a clock control state machine coupled to said clock control output signal line, said clock control state machine controls a clocking frequency of the internal clock through activation and alternatively deactivation of the clock control output signal line, a stop clock circuit coupled to said clock control state machine, said stop clock circuit outputs an active stop clock input signal into said clock control state machine upon detecting a stop clock event, the active stop clock input signal causes said clock control state machine to activate the clock control output signal line, a stop break circuit coupled to said clock control state machine, said stop break circuit outputs an active stop break event signal into said clock control state machine upon detecting a stop break event, the active stop break event signal causes said clock control state machine to deactivate the clock control output signal line, and a frequency emulation circuit coupled to said clock control state machine, said frequency emulation circuit includes at least one run timer and at least one idle timer, wherein said run timer is programmed to enable the internal clock to run for a first time period, and the idle timer is programmed to enable the internal clock to stop for a second time period.

31. The computer system according to claim 30 further comprising:

speedup circuit coupled to said clock control state machine, said speedup circuit generates a speedup signal to instruct the internal clock to operate at the predetermined frequency, wherein the speedup circuit further includes at least one speedup event output signal line and at least one storage element supporting masking operating associated with a plurality of speedup event input lines in which one of said plurality of speedup event input lines being activated upon detection of a corresponding speedup event; and a speedup timer event circuit coupled to said clock control state machine, said speedup timer event circuit includes a speedup timer logic device coupled to at least one counter circuit through at least a first control signal.

32. The computer system according to claim 30, wherein the speedup timer logic device includes at least one storage element providing information whether the speedup timer logic device generates at least the first control signal upon detection of the one of the plurality of speedup event.

33. The computer system according to claim 32, wherein the at least one counter circuit includes:

a plurality of local storage element, each storage element contains a bit value;

a multiplexer coupled to said plurality of local storage elements through a plurality of input counter signal lines, said multiplexer outputs a selected bit value into a speedup timer, said selected bit value being chosen by said first control signal; and the speedup timer having a first clocking frequency, the speedup timer generates an active speedup timer signal upon activation by the second control signal.

34. A method for controlling an internal clock operating at a predetermined frequency by altering a status of a clock control output signal line coupled to the internal clock, said method comprising the steps of:

starting the internal clock operating at the predetermined frequency;

emulating a modified clocking frequency for the internal clock if the system is not required to operate at the predetermined frequency, said emulating step includes the steps of programming a first storage element within a idle timer and a second storage element within an idle timer of an emulation circuit, and signaling the internal clock to stop upon expiration of said run timer and to run upon expiration of said idle timer; stopping the internal clock upon detection of a stop clock event; restarting the internal clock upon detection of a stop break event; and switching the clocking frequency of the internal clock to operate at the predetermined frequency upon detection of a speedup event.

\* \* \* \* \*